US010369615B2

(12) United States Patent
Tsukamoto et al.

(10) Patent No.: US 10,369,615 B2
(45) Date of Patent: Aug. 6, 2019

(54) METHOD OF JOINING STRIP-SHAPED SHEETS

(71) Applicant: Toshiba Industrial Products and Systems Corp., Kawasaki-shi, Kanagawa (JP)

(72) Inventors: Yoshihiro Tsukamoto, Mie (JP); Kouichi Mizutani, Mie (JP); Chidai Isaka, Mie (JP)

(73) Assignee: Toshiba Industrial Products and Systems Corp., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/579,500

(22) PCT Filed: Feb. 9, 2016

(86) PCT No.: PCT/JP2016/053806
§ 371 (c)(1),
(2) Date: Dec. 4, 2017

(87) PCT Pub. No.: WO2016/199447
PCT Pub. Date: Dec. 15, 2016

(65) Prior Publication Data
US 2018/0147619 A1 May 31, 2018

(30) Foreign Application Priority Data
Jun. 9, 2015 (JP) .................................. 2015-116515

(51) Int. Cl.
*B21D 43/00* (2006.01)
*B21C 47/00* (2006.01)
(Continued)

(52) U.S. Cl.
CPC .......... *B21D 43/021* (2013.01); *B21C 47/247* (2013.01); *B21C 47/26* (2013.01);
(Continued)

(58) Field of Classification Search
None
See application file for complete search history.

(56) References Cited

U.S. PATENT DOCUMENTS 3,245,861 A * 4/1966 Roshkind ........... B65H 19/1852
156/157
3,434,907 A * 3/1969 Philippi ............... G03D 15/043
156/505
(Continued)

FOREIGN PATENT DOCUMENTS

CN 1660560 8/2005
CN 102481659 5/2012
(Continued)

OTHER PUBLICATIONS

International Search Report issued in PCT/JP2016/053806 dated May 10, 2016.
(Continued)

*Primary Examiner* — Linda L Gray
(74) *Attorney, Agent, or Firm* — DLA Piper LLC

(57) ABSTRACT

A method of joining strip-shaped sheets includes a support step of placing a support member in contact with a reverse feed direction end of a strip-shaped sheet fed to a pressing machine and a feed direction end of a new strip-shaped sheet, and a joining step of joining the new strip-shaped sheet to the strip-shaped sheet by attaching a tape on the reverse feed direction end of the strip-shaped sheet and the feed direction end of the new strip-shaped sheet, wherein in the joining step, the tape is attached from a side opposite the support member with the support member placed in contact with the reverse feed direction end of the strip-shaped sheet and the feed direction end of the new strip-shaped sheet. The problem of the variation in welding quality encountered
(Continued)

when welding thin and wide strip-shaped sheets together is resolved and the strip-shaped sheet is fed smoothly.

6 Claims, 18 Drawing Sheets

(51) Int. Cl.

| | | |
|---|---|---|
| *B26D 1/00* | (2006.01) | |
| *B29C 65/00* | (2006.01) | |
| *B65H 19/00* | (2006.01) | |
| *B21D 43/02* | (2006.01) | |
| *B21C 47/26* | (2006.01) | |
| *B26D 1/02* | (2006.01) | |
| *B26D 1/03* | (2006.01) | |
| *B21D 43/28* | (2006.01) | |
| *B29C 65/50* | (2006.01) | |
| *B21C 47/24* | (2006.01) | |
| *B21D 28/08* | (2006.01) | |
| *B65H 21/00* | (2006.01) | |
| *B65H 19/18* | (2006.01) | |
| *B29C 65/24* | (2006.01) | |

(52) U.S. Cl.
CPC .......... *B21D 28/08* (2013.01); *B21D 43/287* (2013.01); *B26D 1/02* (2013.01); *B26D 1/03* (2013.01); *B29C 65/5007* (2013.01); *B29C 66/8362* (2013.01); *B65H 19/1852* (2013.01); *B65H 21/00* (2013.01); *B29C 65/242* (2013.01); *B29C 66/8322* (2013.01); *B65H 2301/4631* (2013.01); *B65H 2701/173* (2013.01)

(56) References Cited

U.S. PATENT DOCUMENTS

| | | | |
|---|---|---|---|
| 4,239,582 A * | 12/1980 | McGrath | B65H 21/00 156/157 |
| 5,405,470 A | 4/1995 | Held | |
| 2017/0050330 A1* | 2/2017 | Kerwin | B26D 5/20 |

FOREIGN PATENT DOCUMENTS

| | | |
|---|---|---|
| CN | 204369261 | 6/2015 |
| JP | S54-025578 | 2/1979 |
| JP | S58-068437 | 4/1983 |
| JP | 2014-104500 | 6/2014 |

OTHER PUBLICATIONS

Written Opinion issued in PCT/JP2016/053806 dated May 10, 2016.
English Language Abstract of JP S54-025578 published Feb. 26, 1979.
English Language Abstract of JP S58-068437 published Apr. 23, 1983.
English Language Abstract of JP H06-509537 published Oct. 27, 1994.
English Language Abstract of JP S57-064428 published Apr. 19, 1982.
English Language Abstract of JP 2014-104500 published Jun. 9, 2014.
Chinese Office Action issued in CN 201680028093.6 dated Sep. 3, 2018.

* cited by examiner

METHOD OF JOINING STRIP-SHAPED SHEETS

CROSS REFERENCE TO RELATED APPLICATIONS

This application is a U.S. National Stage Application of International Application No. PCT/JP2016/053806 filed Feb. 9, 2016, which claims priority from Japanese Patent Application No. 2015-116515 filed Jun. 9, 2015. The entirety of all the above-listed applications are incorporated herein by reference.

FIELD

Embodiments disclosed herein relate to a method of joining strip-shaped sheets.

BACKGROUND

When punching out products from a strip-shaped sheet with a progressive pressing apparatus, it will not be possible to feed the strip-shaped sheet in case the strip-shaped sheet has become too short. In such case, the strip-shaped sheet is manually removed from the progressive pressing apparatus and a new strip-shaped sheet is manually set to the progressive pressing apparatus.

SUMMARY

Problem Solved

JP 2014-104500 A discloses welding a reverse feed direction end of a strip-shaped sheet with a feed direction end of a new strip-shaped sheet when the strip shaped sheet has become short and feeding the new strip-shaped sheet subsequent to the strip-shaped sheet. Welding is a technique suited for processing thick and narrow strip-shaped sheets. Thus, application of welding to thin and wide strip-shaped sheets results in unstable welding quality. Hence, joining thin and wide strip-shaped sheets by welding has not been reduced to practice.

Solution to Problem

A method of joining strip-shaped sheets according to an embodiment includes a support step of placing a support member in contact with a reverse feed direction end of a strip-shaped sheet fed to a pressing machine and a feed direction end of a new strip-shaped sheet, and a joining step of joining the new strip-shaped sheet to the strip-shaped sheet by attaching a tape on the reverse feed direction end of the strip-shaped sheet and the feed direction end of the new strip-shaped sheet, wherein in the joining step, the tape is attached from a side opposite the support member with the support member placed in contact with the reverse feed direction end of the strip-shaped sheet and the feed direction end of the new strip-shaped sheet.

EMBODIMENTS OF INVENTION (First Embodiment)

Figure 1:
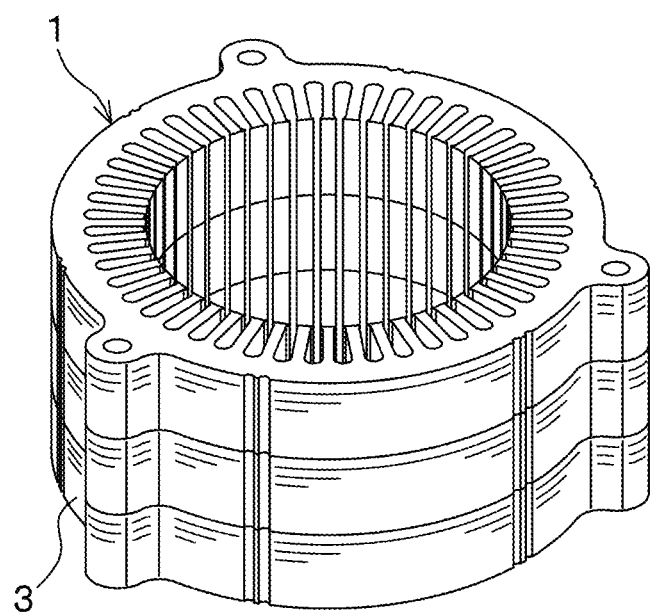
FIG. 1 illustrates a first embodiment (illustrates an exterior look of a stator core).

A stator core 1 shown in FIG. 1 is used in a three-phase synchronous motor serving as a drive source of a hybrid vehicle. The stator core 1 is shaped like a cylinder and is formed by stacking plural stator blanks 3 in the axial direction.

Figure 2:
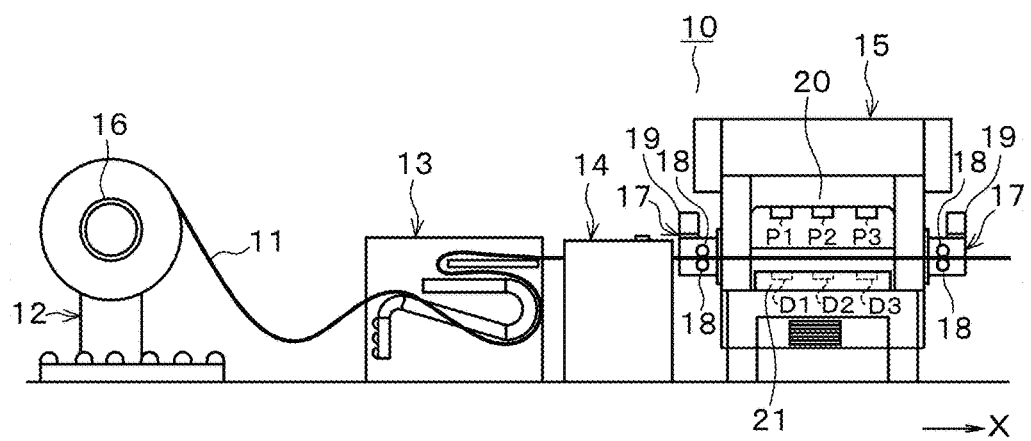
FIG. 2 illustrates a progressive processing apparatus.
Figure 3:
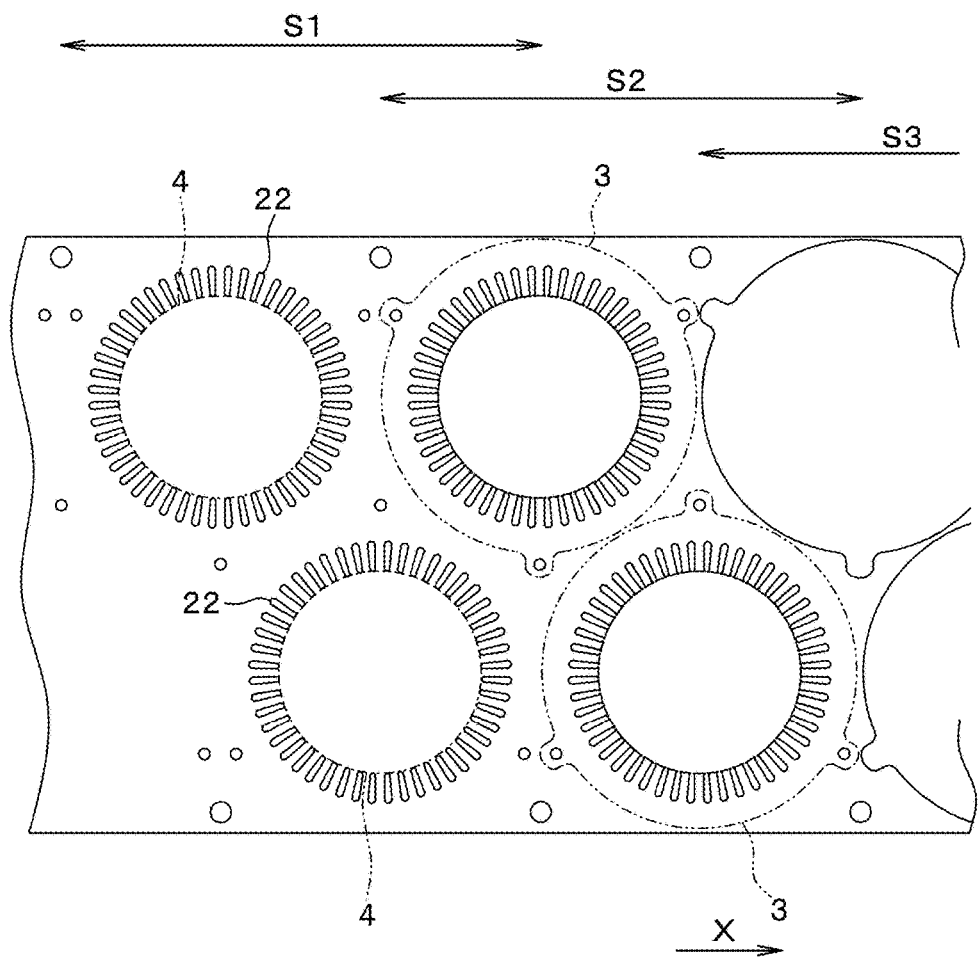
FIG. 3 illustrates stator blanks being punched out from a strip-shaped steel sheet.

A progressive pressing apparatus 10 shown in FIG. 2 is configured to punch out stator blanks 3 from a strip-shaped steel sheet 11 and is provided with an uncoiler 12, a leveler 13, a joining machine 14, and a pressing machine 15. The uncoiler 12 is provided with a drive shaft 16 rotatable about an axial line. The drive shaft 16 has the strip-shaped steel sheet 11 wound like a coil detachably attached thereto. The strip-shaped steel sheet 11 is formed of a silicon steel sheet having a thickness equal to or less than 0.30 mm. As shown in FIG. 3, the stator blanks 3 are punched out from the strip-shaped steel sheet 11 in two rows taken along the shorter side direction of the strip-shaped steel sheet 11.

As shown in FIG. 2, the leveler 13 is disposed in the direction indicated by arrow X from the uncoiler 12 and unwound portion of the strip-shaped steel sheet 11 is inserted to the leveler 13. The leveler 13 plastically deforms the strip-shaped steel sheet 11 by applying external force to the strip-shaped steel sheet 11. The strip-shaped steel sheet 11 is uncurled by plastically deforming the strip-shaped steel sheet 11.

As shown in FIG. 2, the pressing machine 15 is disposed in the arrow X direction from the leveler 13. An uncurled strip-shaped steel sheet 11 is supplied to the pressing machine 15 from the leveler 13. The pressing machine 15 is provided with two sets of feed rolls 17. One of the feed rolls 17 is provided on one end of the pressing machine 15 located in the direction indicated by arrow X and the other of the feed rolls 17 is provided on the other end of the pressing machine 15 located in the direction opposite the direction indicated by arrow X. Each of the two sets of feed rolls 17 is provided with two rollers 18 opposing one another in the up and down direction. The strip-shaped steel sheet 11 is passed between the rollers 18 of the feed rolls 17 located in the direction indicated by arrow X and thereafter inserted between the rollers 18 of the feed rolls 17 located in the direction opposite the direction indicated by arrow X.

Each of the feed rolls 17 is provided with a feed motor 19 as shown in FIG. 2. One of the feed motors 19 rotates the two rollers 18 of one of the feed rolls 17. The other of the feed motors 19 rotates the two rollers 18 of the other of the feed rolls 17. The strip-shaped steel sheet 11 is fed in the arrow X direction by the rotation of the four rollers 18. In the following description, the arrow X direction is referred to as the feed direction and the direction opposite the arrow X direction is referred to as the reverse feed direction.

The pressing machine 15 comprises a mechanical press configured to convert a rotary motion of a press motor into a linear reciprocating motion. The pressing machine 15 is provided with an upper die 20 and a lower die 21 as shown in FIG. 2. The upper die 20 supports punch P1, punch P2, and punch P3. The upper die 20 repeats the reciprocation between the top dead point and the bottom dead point when the press motor is operated. The lower die 21 supports die D1, die D2, and die D3. The dies D1 to D3 are aligned in one row from the reverse feed direction to the feed direction at equal pitch P. When the upper die 20 is in the top dead point, punch P1 faces down on die D1, punch P2 faces down on die D2, and punch P3 faces down on die 3.

Both feed rolls 17 of the pressing machine 15 feed the strip-shaped steel sheet 11 intermittently from the reverse feed direction to the feed direction. The feed pitch of the strip-shaped steel sheet 11 is specified to pitch P which is identical to the alignment pitch of the dies D1 to D3. The strip-shaped steel sheet 11 is fed intermittently by pitch P so as to be sequentially supplied "between die D1 and punch P1"→"between die D2 and punch P2"→"between die D3 and punch P3". The dies D1 to D3 and punches P1 to P3 apply shearing process on the strip-shaped steel sheet 11 to punch out stator blanks 3 from the strip-shaped steel sheet 11 in two rows taken along the shorter side direction of the strip-shaped steel sheet 11 as shown in FIG. 3. The two feed rolls 17 stop the feeding of the strip-shaped steel sheet 11 at the timing when shearing process is applied to the strip-shaped steel sheet 11.

The die D1 and the punch P1 constitute a processing stage S1 as shown in FIG. 3. In the processing stage S1, plural long holes 22 are formed on the strip-shaped steel sheet 11 by shearing process in two rows taken along the shorter side direction of the strip-shaped steel sheet 11. Each of the long holes 22 formed in each row becomes the slot of the stator core 1 and the long holes 22 are arranged on a circular trajectory. The die D2 and the punch P2 constitute a processing stage S2 and in processing stage S2, circular sheets 4 are punched out from the strip-shaped steel sheet 11 in two rows taken along the shorter side direction of the strip-shaped steel sheet 11.

The die D3 and punch P3 constitute a processing stage S3 as shown in FIG. 3. In the processing stage S3, the stator blank 3 is punched out from the strip-shaped steel sheet 11 in two rows taken along the shorter side direction of the strip-shaped steel sheet 11. The stator blanks 3 fall into the die D3. By repeatedly punching out the stator blanks 3, the stator blanks 3 are stacked upward one after another inside the die D3.

The joining machine 14 is disposed between the leveler 13 and the pressing machine 15 as shown in FIG. 2. The stripe-shaped sheet 11 is supplied from the leveler 13 to the pressing machine 15 via the joining machine 14. The joining machine 14 joins the remaining strip-shaped steel sheet 11 with a new strip-shaped steel sheet 11 and corresponds to a joining apparatus. The remaining strip-shaped steel sheet 11 has stator blanks 3 punched out therefrom by the pressing machine 15. The new strip-shaped steel sheet 11 is attached to the uncoiler 12 subsequent to the remaining strip-shaped steel sheet 11 and is an unprocessed sheet which has not been subjected to shearing process in the initial processing stage S1 of the pressing machine 15.

The joining machine 14 cuts an end portion in the reverse feed direction of the remaining strip-shaped steel sheet 11 to create a new end surface to the remaining strip-shaped steel sheet 11. The joining machine 14 cuts an end portion in the feed direction of the new strip-shaped steel sheet 11 to create a new end surface to the new strip-shaped steel sheet 11. The new end surface of the remaining strip-shaped steel sheet 11 and the new end surface of the new strip-shaped steel sheet 11 are arranged to horizontally oppose one another and are joined by an adhesive tape 22 (see FIG. 5).

The adhesive tape 22 comprises a polyester film coated with acrylic transparent adhesive agent and is nonmagnetic. The adhesive tape 22 corresponds to a tape. The film of the adhesive tape 22 is nontransparent and is colored differently from the remaining strip-shaped steel sheet 11 and the new strip-shaped steel sheet 11. A description is given hereinafter on the joining machine 14.

Figure 4:
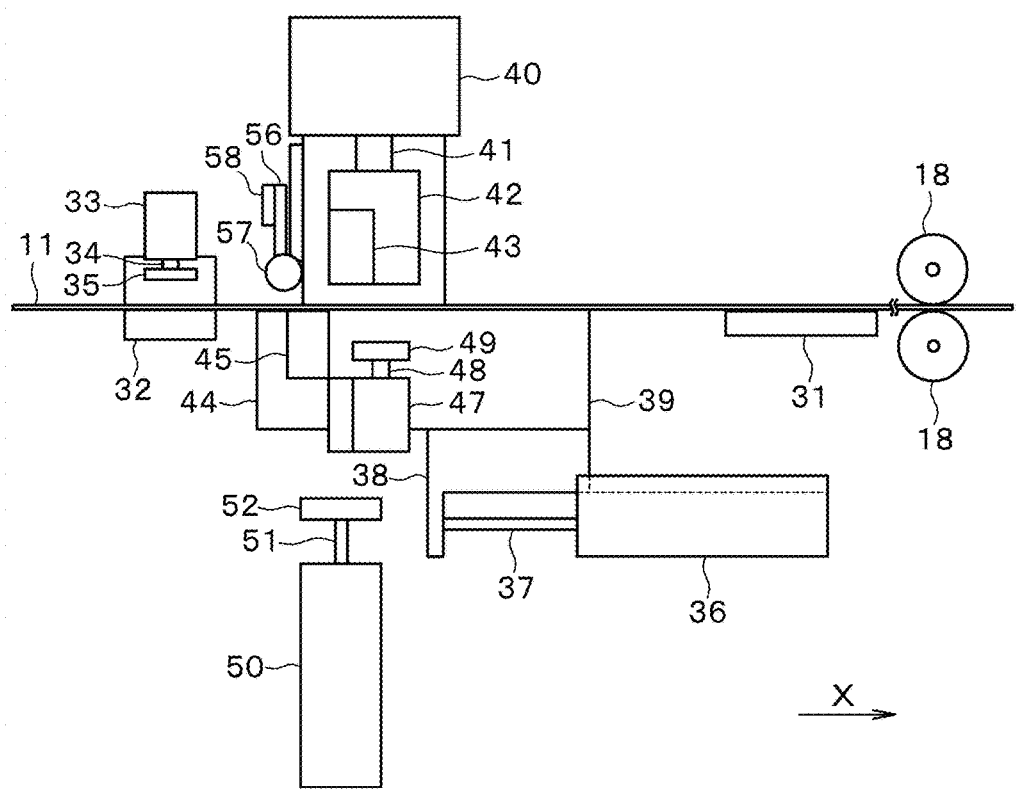
FIG. 4 illustrates a joining machine in its initial state.

As shown in FIG. 4, a table is placed on the floor. The table has a steel sheet support 31 secured thereto. The steel sheet support 31 is provided with a horizontal support surface that supports the strip-shaped steel sheet 11 from below. The table has a clamp base 32 secured thereon so as to be located on the reverse feed direction side from the steel sheet support 31. The clamp base 32 is provided with a horizontal clamp surface that supports the strip-shaped steel sheet 11 from below. The clamp base 32 has a clamp cylinder 33 secured thereto. The clamp cylinder 33 comprises an air cylinder and is provided with a rod 34 movable in the up and down direction.

A clamp 35 is secured to the rod 34 of the clamp cylinder 33 as shown in FIG. 4. The clamp 35 is moved between the lifted position and the lowered position lower than the lifted position as the result of the movement of the rod 34 of the clamp cylinder 33. The clamp 35 is provided with a horizontal clamp surface. The clamp surface of the clamp 35 faces the strip-shaped steel sheet 11 from above with clearance therebetween when the clamp 35 is in the lifted position. The clamp 35 and a clamp surface of the clamp base 32 clamp the strip-shaped steel sheet 11 therebetween when the clamp 35 is in the lowered position.

A shearing base cylinder 36 is secured to the table as shown in FIG. 4. The shearing base cylinder 36 comprises an air cylinder and is provided with a rod 37 movable in the feed direction and the reverse feed direction. A bracket 38 is secured to the rod 37. A shearing base 39 is secured to the bracket 38. The shearing base 39 is moved between the cut position and the retracted position located in the feed direction side compared to the cut position as the result of the movement of the rod 37 of the shearing base cylinder 36.

A shearing cylinder 40 is secured to the shearing base 39 as shown in FIG. 4. The shearing cylinder 40 comprises an air cylinder and is provided with a rod 41 movable in the up and down direction. An upper blade 42 is secured to the rod 41. The upper blade 42 is provided with a cutting surface 43 and is moved between the lifted position and a lowered position lower than the lifted position as the result of the movement of the rod 41 of the shearing cylinder 40. The upper blade 42 faces the strip-shaped steel sheet 11 from above with a clearance therebetween when the upper blade 42 is in the lifted position. The upper blade 42 is moved below the strip-shaped steel sheet 11 when the upper blade 42 is in the lowered position.

The shearing base 39 has a lower blade 44 secured thereto as shown in FIG. 4. The lower blade 44 has a cutting surface 45 parallel to the cutting surface 43 of the upper blade 42 formed thereto. The lower blade 44 is disposed below the strip-shaped steel sheet 11. The strip-shaped steel sheet 11 is cut between the cutting surface 43 of the upper blade 42 and the cutting surface 45 of the lower blade 44 while the upper blade 42 moves from the lifted position to the lowered position. As shown in FIG. 5, the cutting surface 43 of the upper blade 42 and the cutting surface 45 of the lower blade 44 are each inclined so as to be non-orthogonal to the feed direction and forms a new end surface 46 which is inclined so as to be non-orthogonal to the feed direction of the strip-shaped steel sheet 11.

A lifter cylinder 47 is secured to the shearing base 39 as shown in FIG. 4. The lifter cylinder 47 comprises an air cylinder and is disposed in the feed direction side of the lower blade 44. The lifter cylinder 47 is disposed below the strip-shaped steel sheet 11. The lifter cylinder 47 is provided with a rod 48 movable in the up and down direction. A lifter 49 is secured to the rod 48. The lifter 49 is moved between the lowered position and the lifted position higher than the lowered position as the result of the movement of the rod 48. The lifter 49 is provided with a horizontal lifting surface. The lifting surface faces the strip-shaped steel sheet 11 from below with a clearance therebetween when the lifter 49 is in the lowered position and supports the strip-shaped steel sheet 11 from below when the lifter 49 is in the lifted position.

The table has a backup cylinder 50 secured thereto as shown in FIG. 4. The backup cylinder 50 is located below the lower blade 44 when the shearing base 39 is in the cut position. The lower blade 44 located above the backup cylinder 50 is retracted toward the feed direction side when the shearing base 39 is moved from the cut position to the retracted position.

The backup cylinder 50 is provided with a rod 51 movable in the up and down direction as shown in FIG. 4. A backup plate 52 is secured to the rod 51. The backup plate 52 is moved between the lowered position and the lifted position higher than the lowered position as the result of the movement of the rod 51 with the shearing base 39 placed in the retracted position.

Figure 5A:
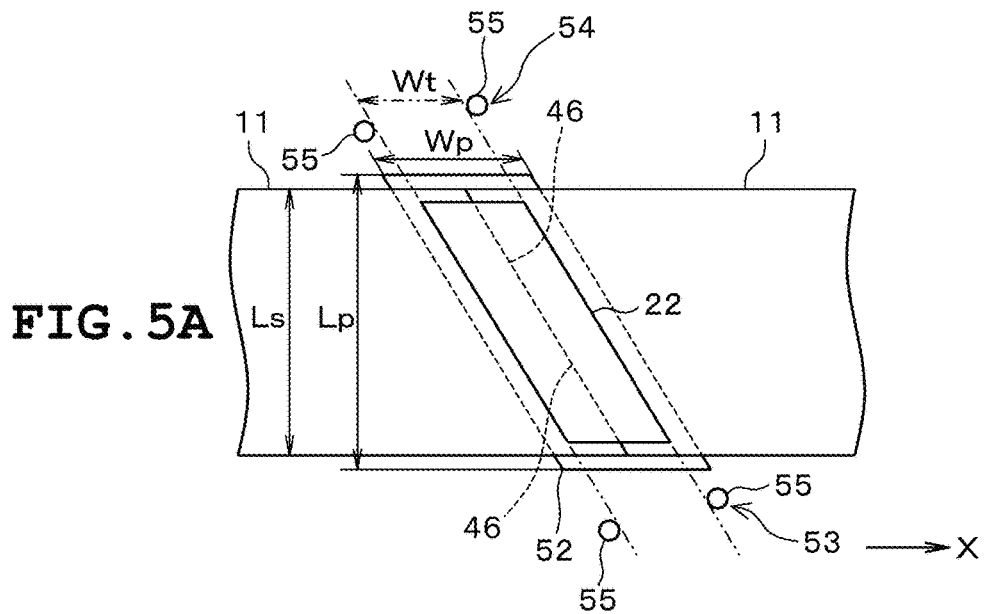
FIG. 5A illustrates a backup plate.

As shown in FIG. 5A, the backup plate 52 is shaped like a narrow and elongate plate parallel with the end surface 46 of the strip-shaped steel sheet 11 when viewed from above. The backup plate 52 is provided with a horizontal backup surface. The backup surface is separated below the strip-shaped steel sheet 11 when the backup plate 52 is in the lowered position and supports the strip-shaped steel sheet 11 from below when the backup plate 52 is in the lifted position. The backup plate 52 corresponds to a support member.

As shown in FIG. 5A, width Lp of the backup plate 52 is set so as to be greater than width Ls of the strip-shaped steel sheet 11. Widths Lp and Ls are dimensions taken along a direction parallel to the shorter side direction of the strip-shaped steel sheet 11. When the backup plate 52 is in the lifted position, one end surface in the longer side direction of the backup plate 52 projects outward from one end surface in the shorter side direction of the strip-shaped steel sheet 11 and the other end surface in the longer side direction of the backup plate 52 projects outward from the other end surface in the shorter side direction of the strip-shaped steel sheet 11 when viewed from above.

As shown in FIG. 5A, the shearing base 39 has tape guides 53 and 54 secured thereto. The tape guides 53 and 54 obliquely face one another in the shorter side direction of the strip-shaped steel sheet 11 so as to sandwich the strip-shaped steel sheet 11 therebetween. The tape guides 53 and 54 are each provided with two pins. The two pins of the tape guides 53 and 54 face one another with a clearance therebetween which is substantially equal to the shorter side direction width of the adhesive tape 22. The adhesive tape 22 assumes its regular position by being inserted between the two pins 55 of the tap guide 53 and the two pins 55 of the tape guide 54 from above. When in the regular position, the adhesive tape 22 becomes parallel to the end surface 46 of the strip-shaped steel sheet 11. When in the regular position, half of the adhesive tape 22 in the feed direction side overlaps with the remaining strip-shaped steel sheet 11 from above and half of the adhesive tape 22 in the reverse feed direction side overlaps with the new strip-shaped steel sheet 11 from above.

As shown in FIG. 5A, width Wp of the shorter side direction of the backup plate 52 is set so as to be greater than width Wt of the shorter side direction of adhesive tape 22. When the adhesive tape 22 is in the regular position and the backup plate 52 is in the lifted position, the end surface in the feed direction side of the backup plate 52 projects to the feed direction side compared to the end surface in the feed direction side of the adhesive tape 22 and the end surface in the reverse feed direction side of the backup plate 52 projects to the reverse feed direction side compared to the end surface in the reverse feed direction side of the adhesive tape 22 when viewed from above.

Figure 6:
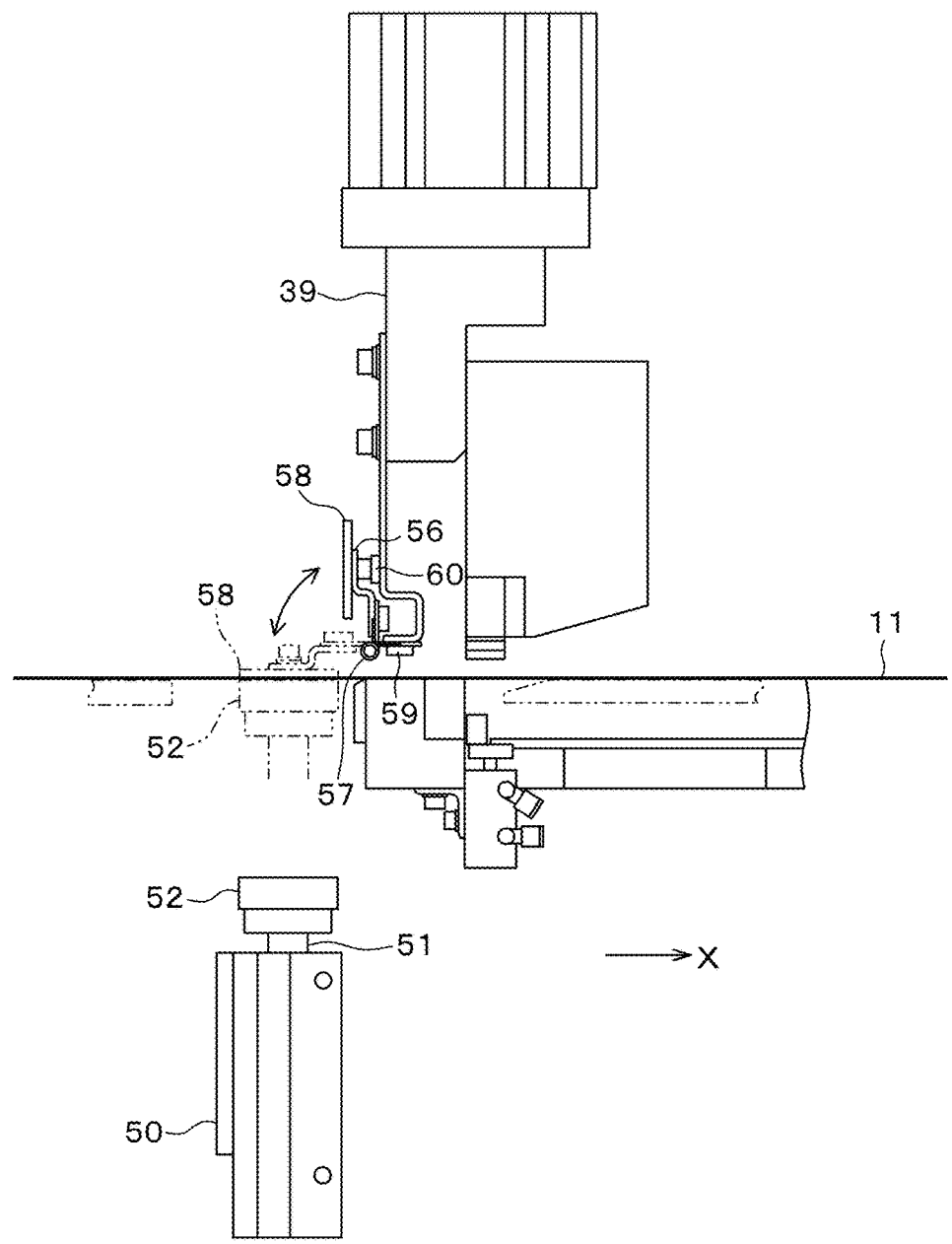
FIG. 6 illustrates the presser plate of the joining machine.

As shown in FIG. 6, the shearing base 39 has an arm 56 attached thereto which is rotatable about a horizontal shaft 57. A presser plate 58 is secured to the arm 56. The presser plate 58 is moved between the retracted position (see the solid line) and the pressing position (see the double dot chain line) by the rotation of the arm 56 about the shaft 57. The presser plate 58 is oriented vertically in the retracted position and is oriented horizontally in the pressing position.

As shown in FIG. 6, a return spring 59 comprising a torsion spring is attached to the shaft 57 of the arm 56. The return spring 59 biases the arm 56 in the clockwise direction as viewed in FIG. 6. The return spring 59, biasing the arm 56 in the clockwise direction, causes the arm 56 to contact a stopper 60. The stopper 60 is secured to the shearing base 39. The presser plate 58 is placed in the retracted position as the result of the arm 56 contacting the stopper 60.

Figure 5B:
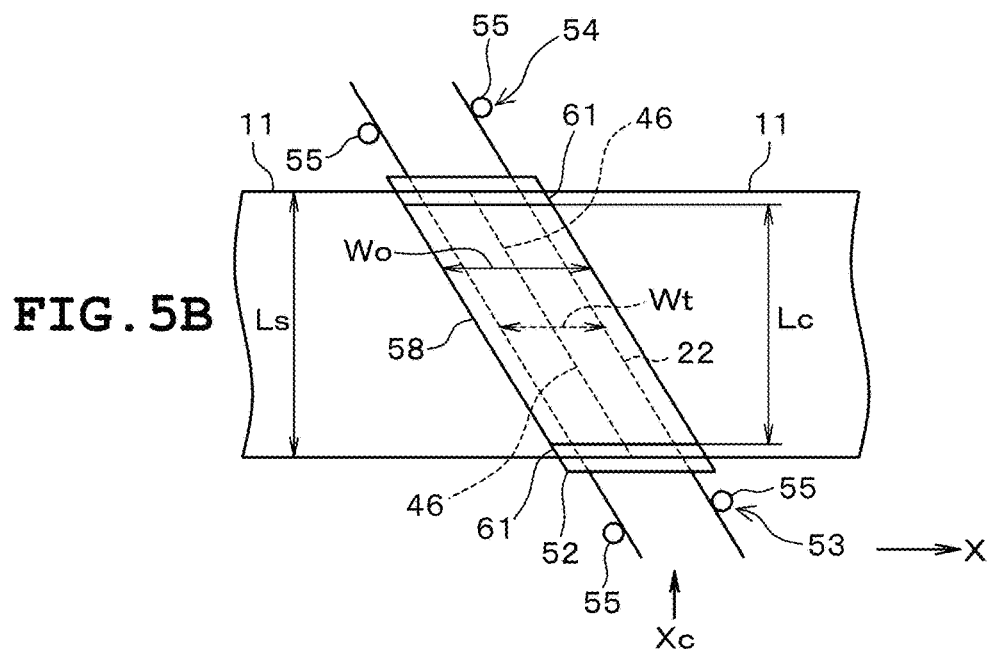
FIG. 5B illustrates a presser plate.

As shown in FIG. 6, the presser plate 58 is manually moved from the retracted position to the pressing position by the operator. As shown in FIG. 5B, the presser plate 58 in the pressing position presses the adhesive tape 22 in the regular position from above. The presser plate 58 is moved against the spring force of the return spring 59. When the operator releases his/her hand from the presser plate 58 in the pressing position, the presser plate 58 returns to the retracted position from the pressing position by the spring force of the return spring 59.

As shown in FIG. 5B, the width Wo taken along the shorter side direction of the presser plate 58 is set to be greater than the width Wt of the adhesive tape 22. When the adhesive tape 22 is in the regular position and the presser plate 58 is in the pressing position, the end surface in the feed direction side of the presser plate 58 projects to the feed direction side compared to the end surface in the feed direction side of the adhesive tape 22 and the end surface in the reverse feed direction side of the presser plate 58 projects to the reverse feed direction side compared to the end surface in the reverse feed direction side of the adhesive tape 22.

Figure 5C:
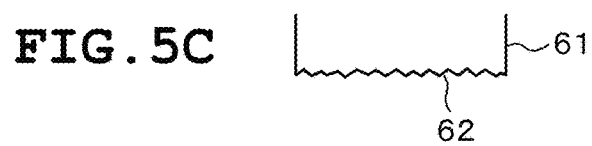
FIG. 5C illustrates a cutter.

As shown in FIG. 5B, a cutter 61 is secured on both ends in the longer side direction of the presser plate 58. As shown in FIG. 5C, each of the cutters 61 is provided with a serrated blade 62. The two blades 62 are each located in the underside of the presser plate 58 when the presser plate 58 is in the pressing position. When the presser plate 58 is in the pressing position, one of the blades 62 contacts the adhesive tape 22 from above at one end in the shorter side direction of the strip-shaped steel sheet 11 and the other of the blades 62 contacts the adhesive tape 22 from above at the other end in the shorter side direction of the strip-shaped steel sheet 11. The blades 62 are used to cut the adhesive tape 22 and the adhesive tape 22 is cut when the operator upwardly presses the adhesive tape 22 against the blades 62 from below.

As shown in FIG. 5B, each of the cutters 61 is disposed so that the blade 62 is parallel to the feed direction when viewed from above. The clearance Lc between the blades 62 is set so as to be smaller than the width Ls of the strip-shaped steel sheet 11. The adhesive tape 22 is cut by the blades 62 into length Lc which is shorter than the width Ls of the strip-shaped steel sheet 11. After the adhesive tape 22 is cut, one end surface in the shorter side direction of the strip-shaped steel sheet 11 projects to the outer side of one end surface in the longer side direction of the adhesive tape 22 and the other end surface in the shorter side direction of the strip-shaped steel sheet 11 projects to the outer side of the other end surface in the longer side direction of the adhesive tape 22 as shown in FIG. 5A.

The clamp cylinder 33, the shearing base cylinder 36, the shearing cylinder 40, the lifter cylinder 47, and the backup cylinder 50 are connected to the compressor via an air pressure circuit. The air pressure circuit reciprocates the clamp cylinder 33 to the backup cylinder 50 individually by the air pressure given by the compressor. The air pressure circuit is provided with a directional control valve, a speed control valve, a decompression valve, etc.

The air pressure circuit is connected to a control circuit. When feeding of the strip-shaped steel sheet 11 is stopped, the control circuit starts the control of the air pressure circuit to activate the joining machine 14 from the initial state. FIG. 4 illustrates the initial state of the joining machine 14. When the joining machine 14 is in the initial state, the clamp 35 and the upper blade 42 are placed in the lifted position, the shearing base 39 is placed in the cut position, and the lifter 49 and the backup plate 52 are placed in the lowered position.

The feeding of the strip-shaped steel sheet 11 is stopped at the timing when the reverse feed direction end is located between the clamp base 32 and the clamp 35 as shown in FIG. 4. At the moment when the feeding of the strip-shaped steel sheet 11 is stopped, the strip-shaped steel sheet 11 is sandwiched by each of the 2 sets of feed rolls and the strip-shaped steel sheet 11 is feedable by the 2 sets of feed rolls 17. At the moment when feeding of the strip-shaped steel sheet 11 is stopped, the strip-shaped steel sheet 11 is completely unwound from the uncoiler 12 and there is no coiled strip-shaped steel sheet 11 attached to the uncoiler 12. A description is given hereinafter in chronological order as to how the joining machine 14 operates in response to the control of the air pressure circuit executed by the control circuit.

Figure 7:
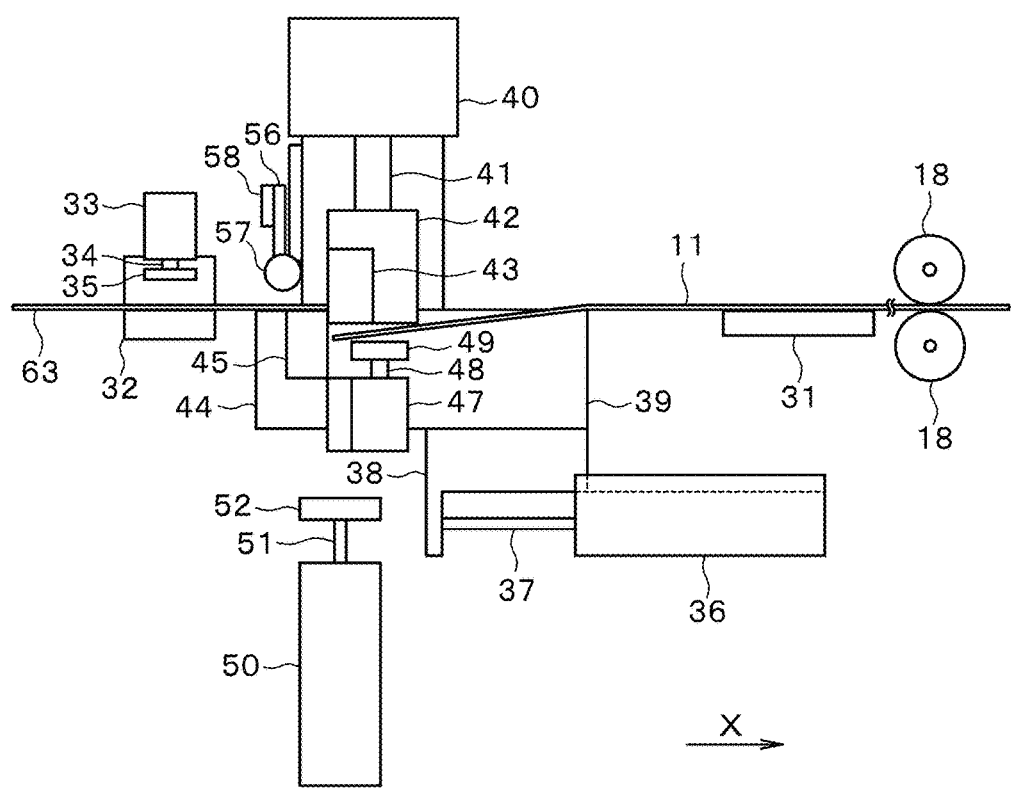
FIG. 7 illustrates the joining machine cutting the remaining strip-shaped steel sheet.

[1] When feeding of the strip-shaped steel sheet 11 is stopped, the upper blade 42 moves from the lifted position to the lowered position with the shearing base 39 placed in the cut position and the cutting surface 43 of the upper blade 42 and the cutting surface 45 of the lower blade 44 cuts the reverse feed direction end from the strip-shaped steel sheet 11 as shown in FIG. 7. In this step, the clamp 35 is placed in the lifted position and the lifter 49 and the backup plate 52 are placed in the lowered position. In this step, the strip-shaped steel sheet 11 in the feed direction side is supported by the 2 sets of feed rolls 17 and the steel sheet support 31. The rest of the strip-shaped steel sheet 11 extending from the feed direction side to the reverse feed side sags down by its own weight.

[2] The upper blade 42 returns to the lifted position from the lowered position with the shearing base 39 placed in the cut position. In this step, the clamp 35 is placed in the lifted position and the lifter 49 and the backup plate 52 are placed in the lowered position.

[3] Waste 63 (see FIG. 7) is removed from the clamp base 32. This waste 63 was cut from the strip-shaped steel sheet 11 and is manually removed by the operator.

Figure 8:
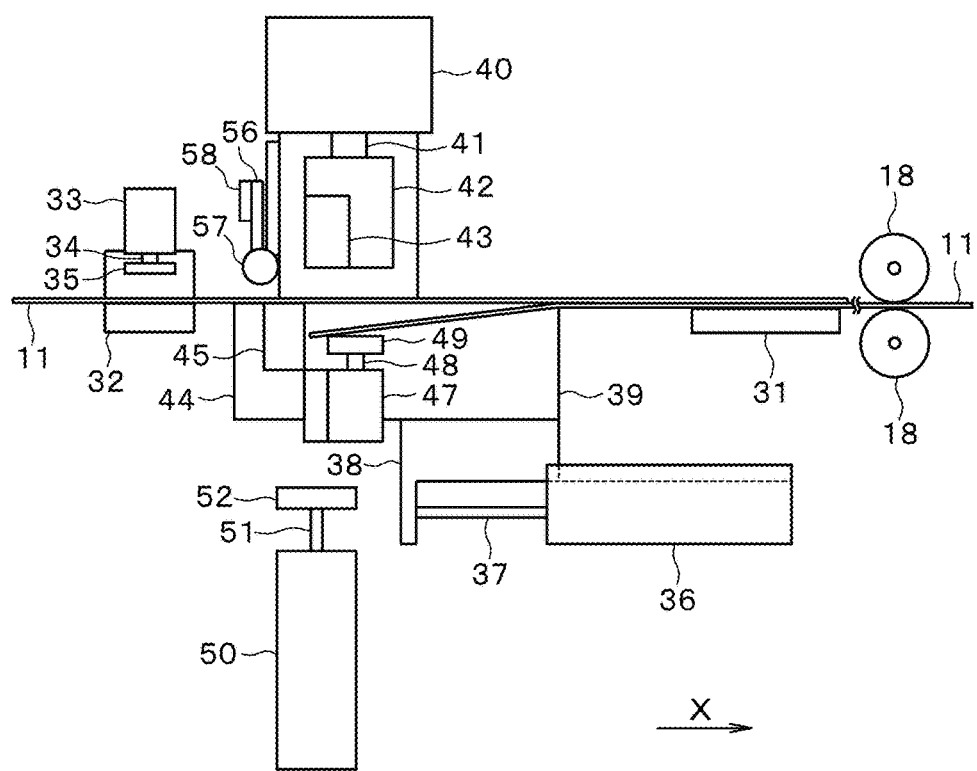
FIG. 8 illustrates the joining machine receiving a supply of the new strip-shaped steel sheet.

[4] The operator attaches a new strip-shaped steel sheet 11 to the drive shaft 16 of the uncoiler 12 and unwinds the new strip-shaped steel sheet 11 from the uncoiler 12 so that the new strip-shaped steel sheet 11 is placed just in front of the feed roll 17 in the reverse feed direction side as shown in FIG. 8. This new strip-shaped steel sheet 11 is passed between the clamp base 32 and the clamp 35 to be inserted between the upper blade 42 and the lower blade 44 and is placed over the remaining strip-shaped steel sheet 11.

Figure 9:
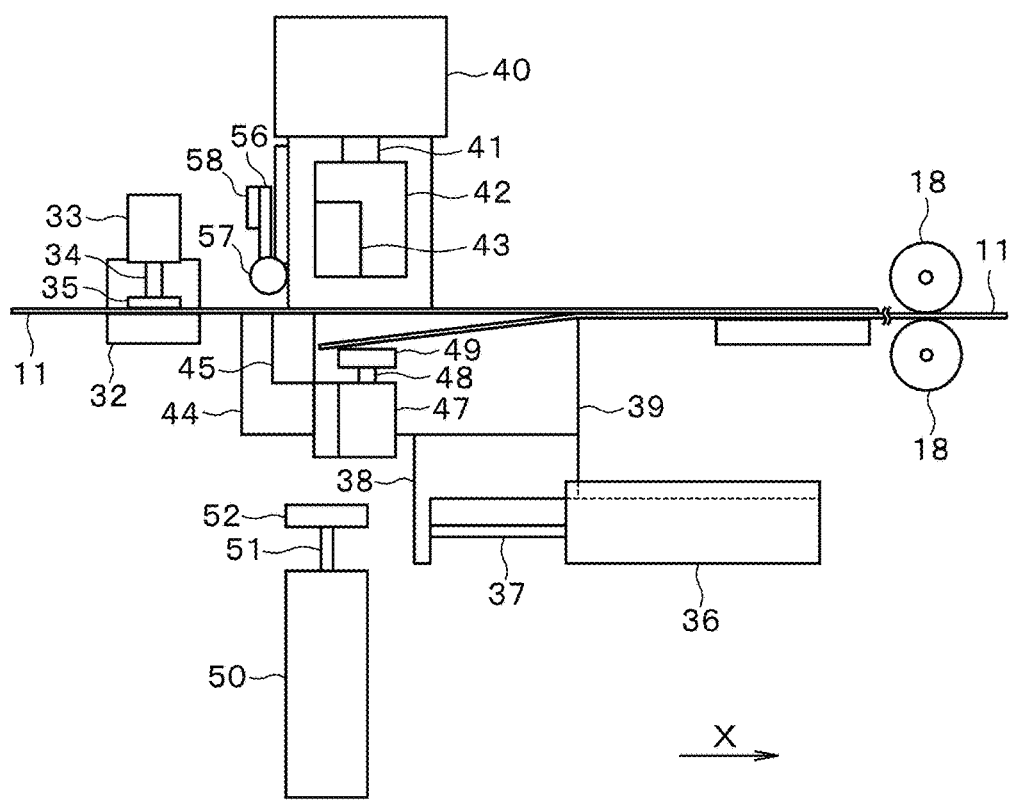
FIG. 9 illustrates the joining machine clamping the new strip-shaped steel sheet.

[5] The clamp 35 moves from the lifted position to the lowered position with the shearing base 39 placed in the cut position and the new strip-shaped sheet 11 is clamped between the clamp base 32 and the clamp 35 as shown in FIG. 9. In this step, the upper blade 42 is placed in the lifted position and the lifter 49 and the backup plate 52 are placed in the lowered position.

Figure 10:
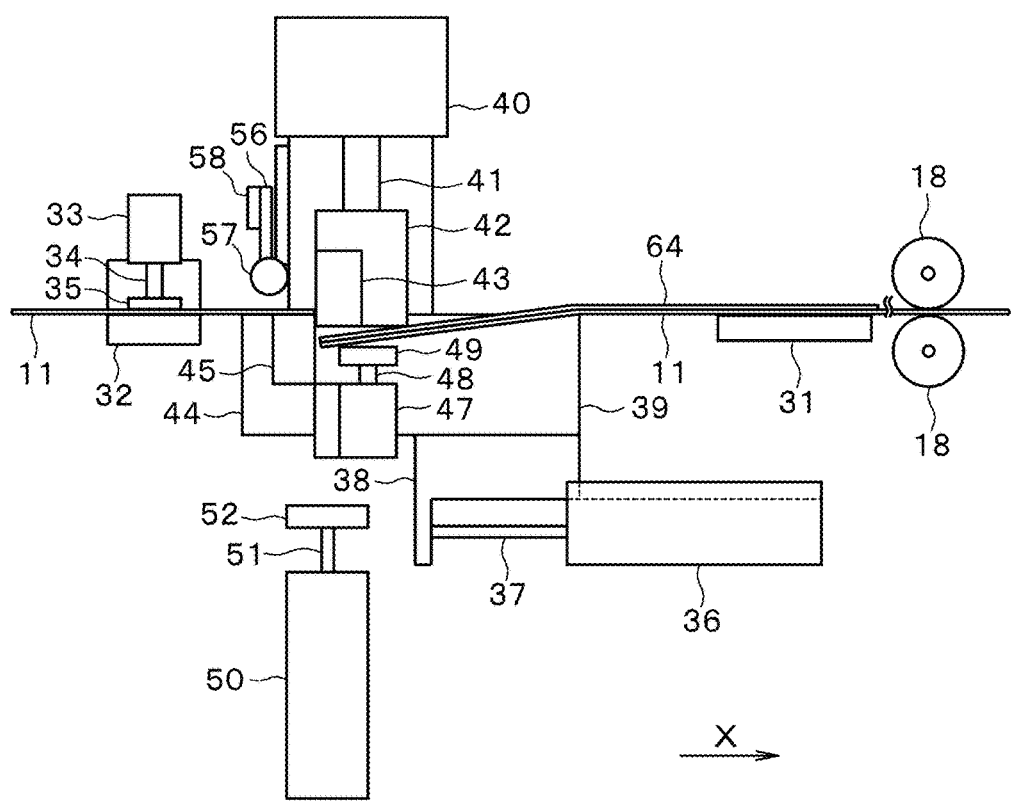
FIG. 10 illustrates the joining machine cutting the new strip-shaped steel sheet.

[6] The upper blade 42 is moved from the lifted position to the lowered position with the shearing base 39 placed in the cut position so that cutting surface 43 of the upper blade 42 and the cutting surface 45 of the lower blade 44 cut the feed direction end from the new strip-shaped sheet 11 as shown in FIG. 10. In this step, the lifter 49 and the backup plate 52 are placed in the lowered position, the new strip-shaped steel sheet 11 is clamped between the clamp base 32 and the clamp 35, and the waste 64 cut from the new strip-shaped steel sheet 11 is supported by the steel sheet support 31 via the remaining strip-shaped steel sheet 11.

[7] The upper blade 42 returns to the lifted position from the lowered position with the shearing base 39 placed in the cut position. In this step, the lifter 49 and the backup plate 52 are placed in the lowered position and the new strip-shaped steel sheet 11 is clamped between the clamp base 32 and the clamp 35.

[8] The operator manually removes the waste 64 from the steel sheet support 31.

Figure 11:
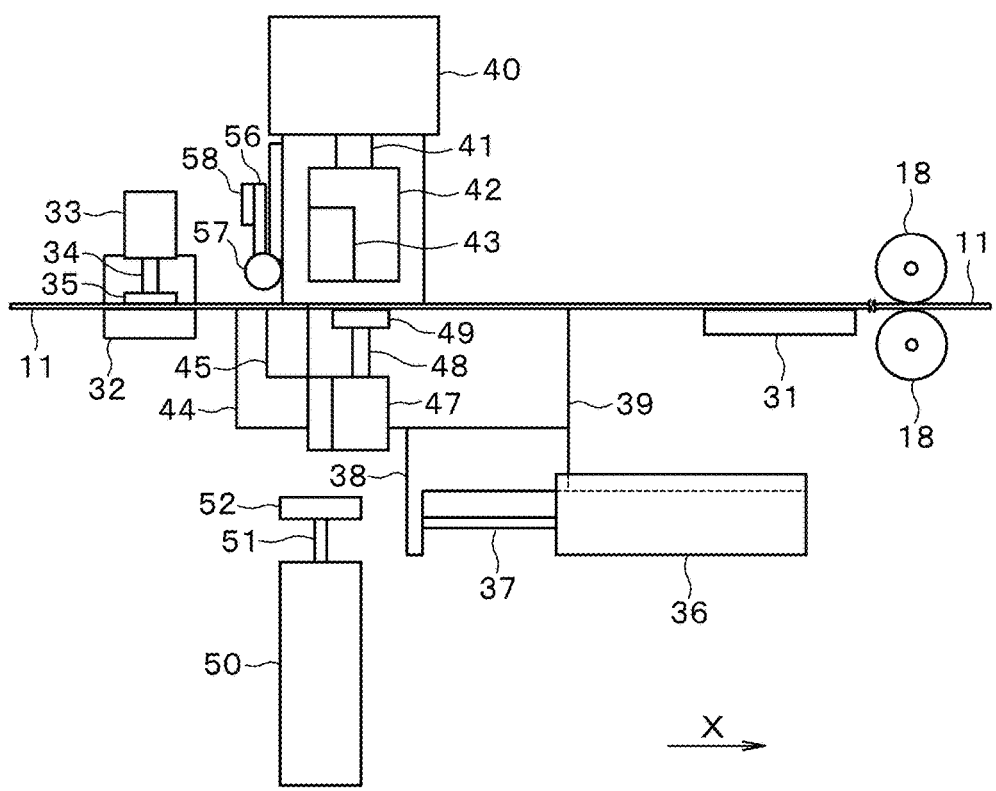
FIG. 11 illustrates the joining machine placing the two strip-shaped steel sheets face to face with one another.

[9] As shown in FIG. 11, the lifter 49 moves from the lowered position to the lifted position with the shearing base 39 placed in the cut position to provide support to the sagging portion of the remaining strip-shaped steel sheet 11 from below. The sagging portion of the remaining strip-shaped steel sheet 11 is placed in a horizontal state by being supported by the lifter 49 and the end surface 46 of the remaining strip-shaped steel sheet 11 becomes horizontally face to face with the end surface 46 of the new strip-shaped steel sheet 11 by the sagging portion being placed in a horizontal state. In this step, the clamp 35 is placed in the lowered position, the upper blade 42 is placed in the lifted position, and the backup plate 52 is placed in the lowered position.

Figure 12:
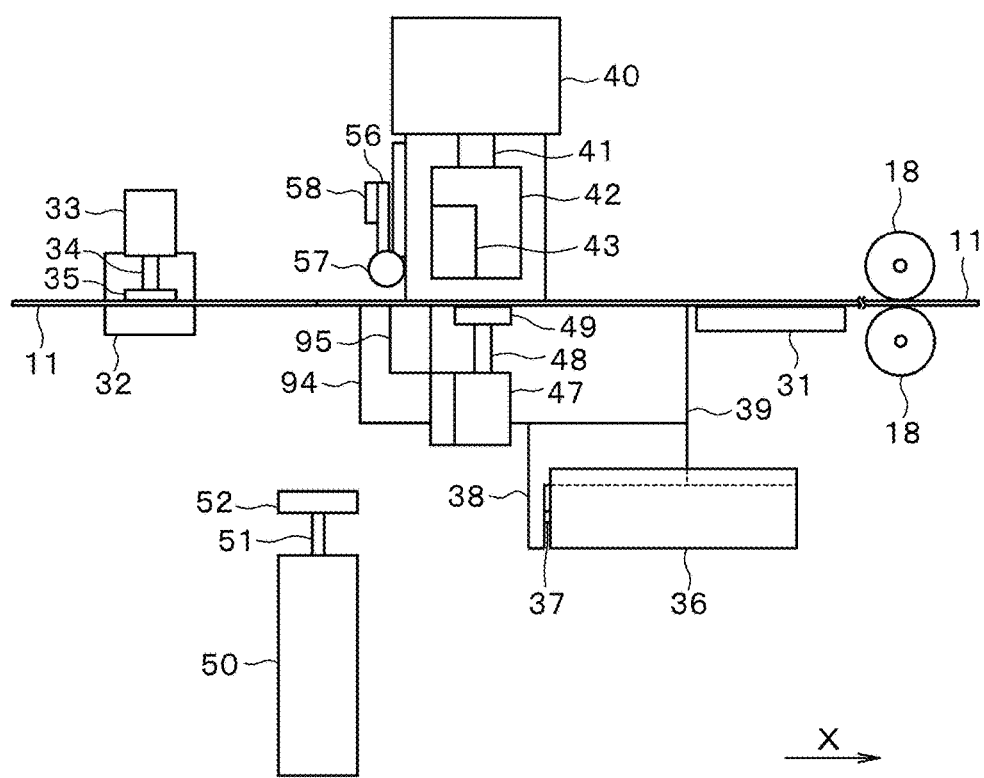
FIG. 12 illustrates the joining machine with a shearing base placed in a retracted state.

[10] As shown in FIG. 12, the shearing base 39 is moved from the cut position to the retracted position with the backup plate 52 placed in the lowered position and the lifter 49 placed in the lifted position. The shearing base 39 is moved without moving the remaining strip-shaped steel sheet 11 and the new strip-shaped steel sheet 11. As the result of the movement of the shearing base 39, the backup plate 52 faces the interface of the end surfaces 46 of the remaining strip-shaped steel sheet 11 and the new strip-shaped steel sheet 11 from below. In this step, the clamp 35 is placed in the lowered position and the upper blade 42 is placed in the lifted position.

Figure 13:
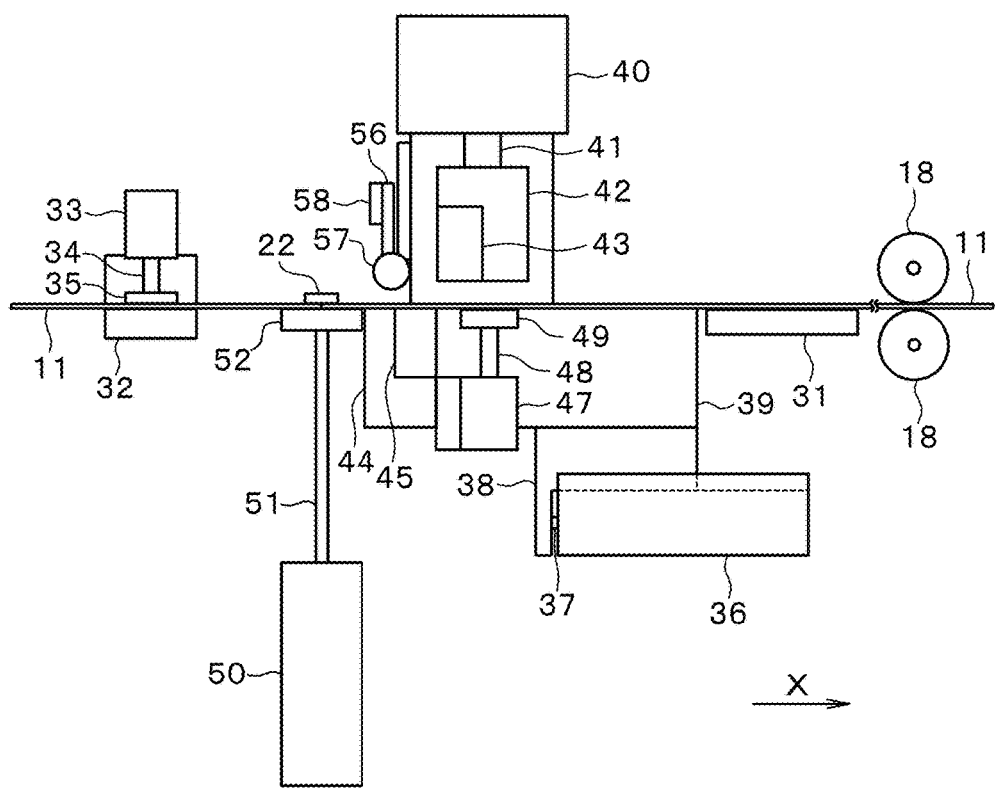
FIG. 13 illustrates the joining machine with the two strip-shaped steel sheets in a backed-up state.

[11] As shown in FIG. 13, the interface of the remaining strip-shapes steel sheet 11 and the new strip-shaped steel sheet 11 is supported from below by the backup plate 52 moved from the lowered position to the lifted position with the shearing base 39 placed in the retracted position. In this step, the clamp 35 is placed in the lowered position, the upper blade 42 is placed in the lifted position, and the lifter 49 is placed in the lifted position.

[12] The adhesive tape 22 is applied over the interface of the remaining strip-shaped steel sheet 11 and the new strip-shaped steel sheet 11 (see FIG. 13). The adhesive tape 22 is passed between the two pins 55 of the tape guide 53 and the two pins 55 of the tape guide 54 from above and pressed against the upper surfaces of the remaining strip-shaped steel sheet 11 and the new strip-shaped steel sheet 11. That is, the adhesive tape 22, assuming the regular position, is attached to the two striped-shaped steel sheets 11. The backup plate 52 supports the two strip-shaped steel sheets 11 from below when attaching the adhesive tape 22 and prevents the two strip-shaped steel sheets 11 from deforming elastically so as to plunge downward by external force applied to the two strip-shaped steel sheets 11 when the operator attaches the adhesive tape 22.

Figure 14:
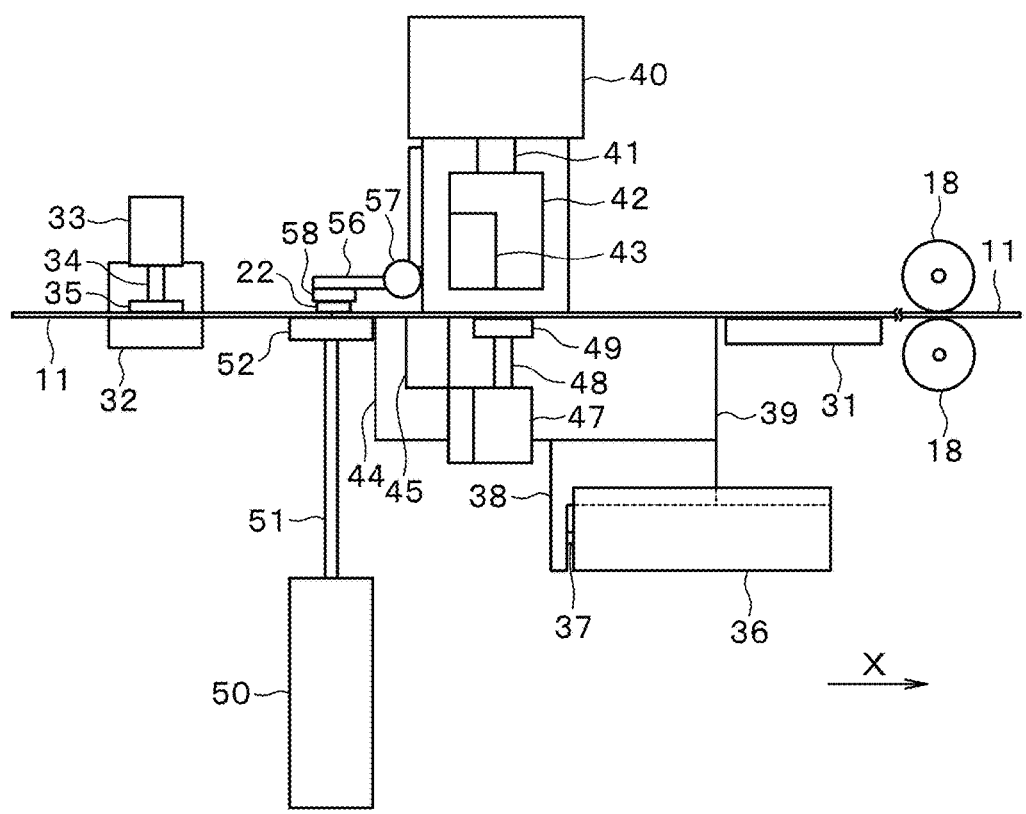
FIG. 14 illustrates the joining machine with the pressing plate in a pressed state.

[13] The operator manually moves the presser plate 58 from the retracted position to the pressing position as shown in FIG. 14 to press the adhesive tape 22 by the presser plate 58 from above. In this step, the clamp 35 is placed in the lowered position, the upper blade 42 is placed in the lifted position, and the lifter 49 and the backup plate 52 are placed in the lifted position.

[14] The operator lifts the two ends of the adhesive tape 22 with the presser plate 58 placed in the pressing position so that the adhesive tape 22 is pressed against the blades 62 of the cutters 61. As a result, the portions of the adhesive tape 22 projecting outward from the blades 62 of the cutters 61 are cut off.

[15] The operator releases the hold of the presser plate 58 to cause the presser plate 58 to return from the pressing position to the retracted position by the spring force of the return spring 59.

Figure 15:
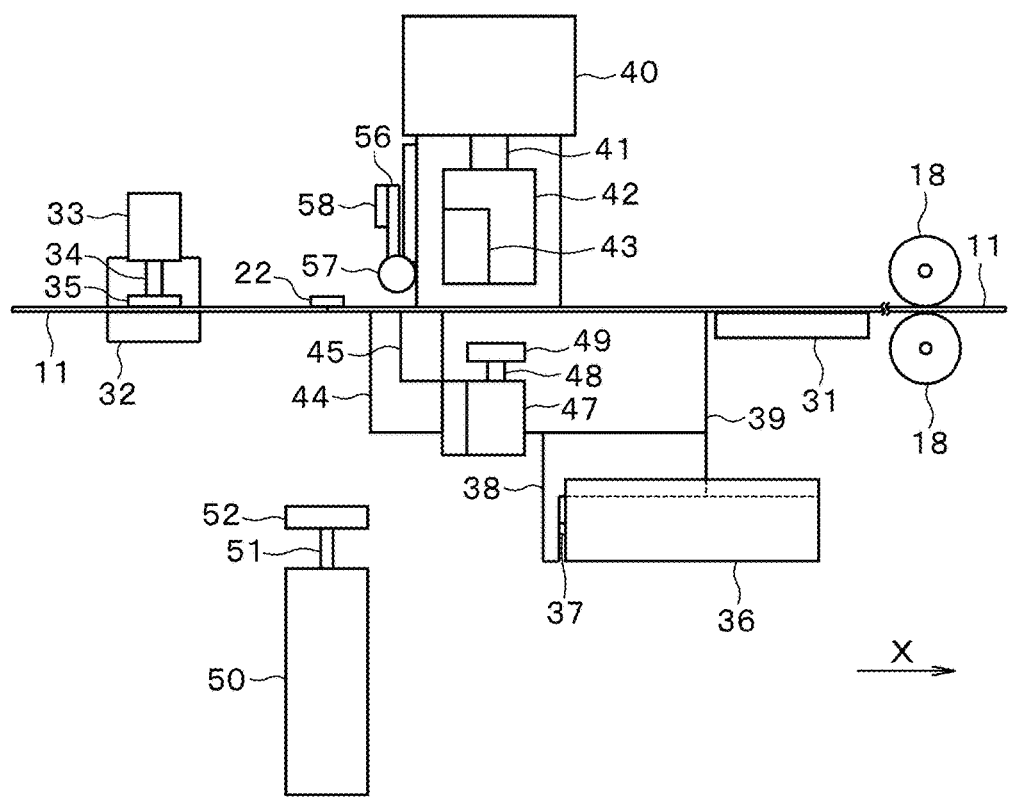
FIG. 15 illustrates the joining machine with a lifter returned to its original position.

[16] As shown in FIG. 15, the backup plate 52 returns to the lowered position from the lifted position with the shearing base 39 placed in the retracted position.

[17] As shown in FIG. 15, the lifter 49 returns to the lowered position from the lifted position with the shearing base 39 placed in the retracted position.

[18] The shearing base 39 returns to the cut position from the retracted position.

Figure 16:
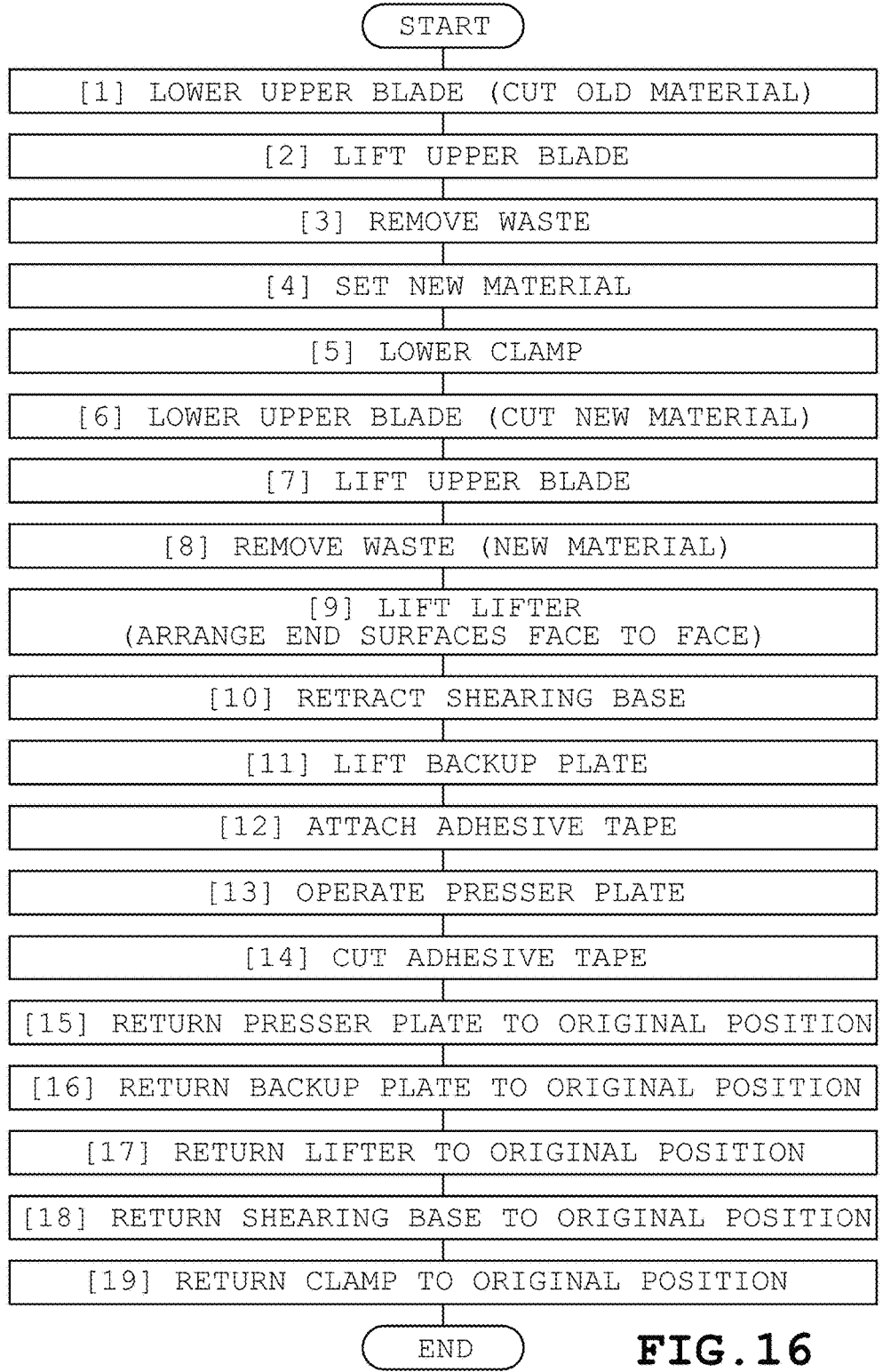
FIG. 16 is a chart for explaining the movement of the joining machine.

[19] The clamp 35 returns to the lifted position from the lowered position to bring the joining machine 14 back to the initial state shown in FIG. 4. After completing step [19], the feeding of the remaining strip-shaped steel sheet 11 and the new strip-shaped steel sheet 11 is restarted. The remaining strip-shaped steel sheet 11 and the new strip-shaped steel sheet 11 are fed to the pressing machine 15 in a joined state to allow the stator blanks 3 to be sequentially punched out from the remaining strip-shaped steel sheet 11 and the new strip-shaped steel sheet 11. FIG. 16 illustrates the flow of steps [1] to [19].

Figure 17:
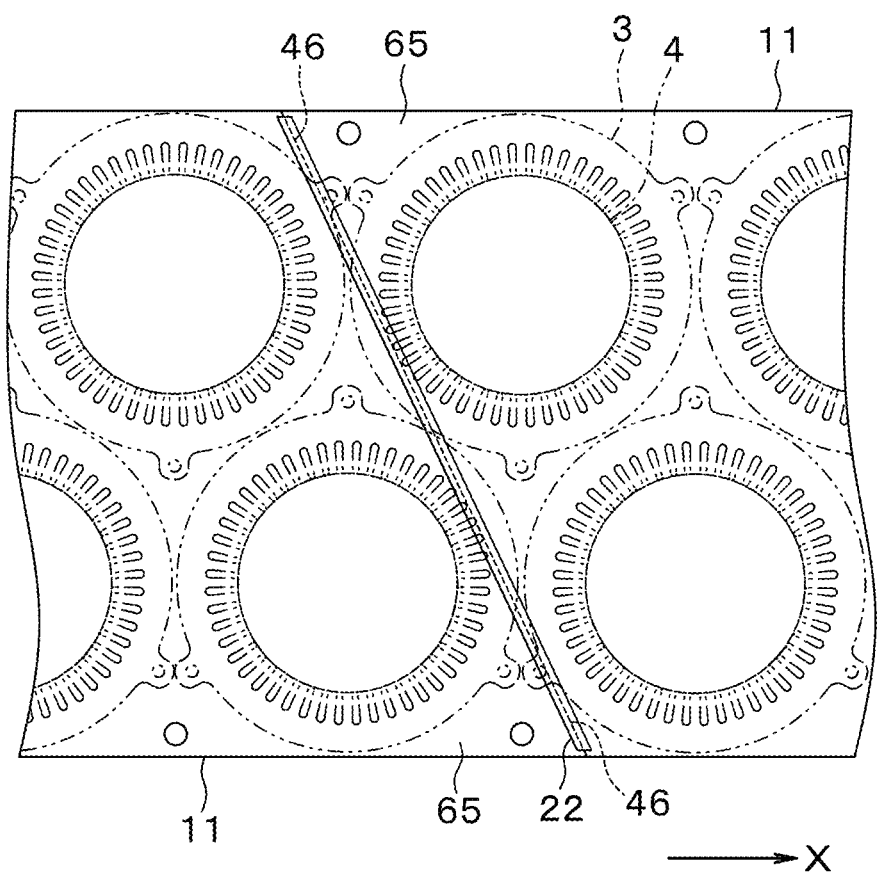
FIG. 17 is a diagram for explaining the location of attachment of an adhesive tape.

FIG. 17 shows how the stator blanks 3 are punched out from the remaining strip-shaped steel sheet 11 and the new strip-shaped steel sheet 11. The upper blade 42 and the lower blade 44 cut the two ends in the shorter side direction of the remaining strip-shaped steel sheet 11 at a position where the remaining strip-shaped steel sheet 11 becomes a leftover material 65 and cut the two ends in the shorter side direction of the new strip-shaped steel sheet 11 at a position where the new strip-shaped steel sheet 11 becomes a leftover material 65. The leftover material 65 is a portion of the striped-shaped steel sheet 11 that does not become a stator blank 3 but is disposed of to the feed direction side from the feed roll 17 in the feed direction side of the pressing machine 15. At the moment when the punching of the remaining strip-shaped steel sheet 11 has been completely finished, the leftover material 65 of the remaining strip-shaped steel sheet 11 is joined to the new strip-shaped steel sheet 11 by the adhesive tape 22.

The first embodiment described above provides the following effects.

The reverse feed direction end of the remaining strip-shaped steel sheet 11 and the feed direction end of the new strip-shaped steel sheet 11 are joined by applying an adhesive tape 22 therebetween. Thus, as the result of the remaining strip-shaped steel sheet 11 being fed by the feed rolls 17, the new strip-shaped steel sheet 11 is subsequently supplied to the pressing machine 15 after the remaining strip-shaped steel sheet 11, and the new strip-shaped steel sheet 11 is pressed by the pressing machine 15 after the remaining strip-shaped steel sheet 11. This reduces the amount of waste material and also reduces setup time. Further, because the problem of the variation in welding quality encountered when welding thin and wide strip-shaped steel sheets 11 together is resolved, it is possible to feed the strip-shaped steel sheet 11 smoothly.

The backup plate 52 is placed in contact with the reverse feed direction end of the remaining strip-shaped steel sheet 11 and the feed direction end of the new strip-shaped steel sheet 11 and the adhesive tape 22 is applied on the two strip-shaped steel sheets 11 from a side opposite the backup plate 52. Thus, the backup plate 52 prevents the two strip-shaped steel sheets 11 from bending by external force when the adhesive tape 22 is attached to the two strip-shaped steel sheets 11. As a result, the entire surface of the adhesive tape 22 sticks stably on the surface of the two strip-shaped steel sheets 11. Thus, the attachment of the adhesive tape 22 is simplified while also stabilizing the joining strength between the two strip-shaped steel sheets 11. Moreover, the backup plate 52 is placed in contact with the ends of the two strip-shaped steel sheets 11 from the below and the adhesive tape 22 is attached to the two strip-shaped steel sheets 11 from above. Thus, unlike the case in which the operator attaches the adhesive tape 22 to the two strip-shaped steel sheets 11 from below, the operator need not attach the adhesive tape 22 to the two strip-shaped steel sheets 11 so as to lift the adhesive tape 22, thereby simplifying the attachment of the adhesive tape 22 even more effectively.

The adhesive tape 22 which is colored differently from the remaining strip-shaped steel sheet 11 and the new strip-shaped steel sheet 11 is used as the tape for joining the two strip-shaped steel sheets 11. This makes it easier to visually confirm whether the adhesive tape 22 is properly attached to the targeted location.

The adhesive tape 22 is cut by the operator with the adhesive tape 22 pressed by the presser plate 58. Thus, unlike the case in which the adhesive tape 22 is cut by scissors, or the like without pressing the adhesive tape 22, the adhesive tape 22 can be prevented from peeling from the two strip-shaped steel sheets 11 by being lifted off from the two strip-shaped steel sheets 11.

The adhesive tape 22 is cut by pressing the two ends of the adhesive tape 22 against the blade 62 of the presser plate 58 with the adhesive tape 22 being pressed by the presser plate 58. Thus, cutting the two ends of the adhesive tape is simplified since the user does not have to go through the troublesome task of cutting the two ends of the adhesive tape 22 with scissors, or the like. Moreover, the locations where the adhesive tape 22 is cut are determined by the location of the blade 62. It is thus, possible to reliably prevent the longer side direction ends of the adhesive tape 22 from sticking out from the shorter side direction ends of the two strip-shaped steel sheets 11.

A serrated blade is used for each of the two blades 62 of the presser plate 58. Thus, safety of the operator is improved compared to a case in which a sharp blade is used for each of the two blades 62.

The width Wp of the backup plate 52 is set so as to be greater than the width Wt of the adhesive tape 22. Thus, external force exerted on the two strip-shaped steel sheets 11 from the adhesive tape 22 when attaching the adhesive tape 22 is received by the entire shorter direction side region of the backup plate 52. It is thus, possible ensure that the two strip-shaped steel sheets 11 are not bent by external force when attaching the adhesive tape 22 to the two strip-shaped steel sheets 11, thereby allowing the adhesive tape 22 to stick to the two strip-shaped steel sheets 11 even more stably.

The reverse feed direction end of the remaining strip-shaped steel sheet 11 is cut obliquely with respect to the shorter side direction to form an inclined end surface 46 and an end surface 46 conforming with the end surface 46 of the remaining strip-shaped steel sheet 11 is formed by cutting the feed direction end of the new strip-shaped steel sheet 11 in a direction conforming with the direction of the end surface 46 of the remaining strip-shaped steel sheet 11. Then, the adhesive tape 22 is attached along the two end surfaces 46. As a result, it is possible to increase the adhesion surface of the adhesive tape 22 on the remaining strip-shaped steel sheet 11 and the new strip-shaped steel sheet 11. Because the joining strength of the two strip-shaped steel sheets 11 is increased, it is possible to prevent the adhesive tape 22 from peeling when the two strip-shaped steel sheets 11 are being fed.

The adhesive tape 22 is attached so that one end surface in the shorter side direction of the remaining strip-shaped steel sheet 11 and one end surface in the shorter side direction of the new strip-shaped steel sheet 11 are located outside the one end surface in the longer side direction of the adhesive tape 22 and the other end surface in the shorter side direction of the remaining strip-shaped steel sheet 11 and the other end surface in the shorter side direction of the new strip-shaped steel sheet 11 are located outside the other end surface in the longer side direction of the adhesive tape 22. Thus, the longer side direction ends of the adhesive tape 22 do not stick out from the end surfaces in the shorter side direction of the two strip-shaped steel sheets 11. It is thus, possible to prevent feeding of the two strip-shaped steel sheets 11 from being affected by the stuck out portions of the adhesive tape 22.

One end in the shorter side direction of the remaining strip-shaped steel sheet 11 and one end in the shorter side direction of the new strip-shaped steel sheet 11 that remain as leftover material 65 without being punched out by the pressing machine 15 are joined with the adhesive tape 22 and the other end in the shorter side direction of the remaining strip-shaped steel sheet 11 and the other end in the shorter side direction of the new strip-shaped steel sheet 11 that remain as leftover material 65 without being punched out by the pressing machine 15 are joined with the adhesive tape 22. As a result, the remaining strip-shaped steel sheet 11 remains joined with the new strip-shaped steel sheet 11 at the moment the end surface 46 of the remaining strip-shaped steel sheet 11 passes through the feed roll 17 in the feed direction side. It is thus, possible to handle the leftover material 65 of the remaining strip-shaped steel sheet 11 and the leftover material 65 of the new strip-shaped steel sheet 11 as one piece of material, thereby facilitating the discarding of the leftover material 65.

(Second Embodiment)

Figure 18A:
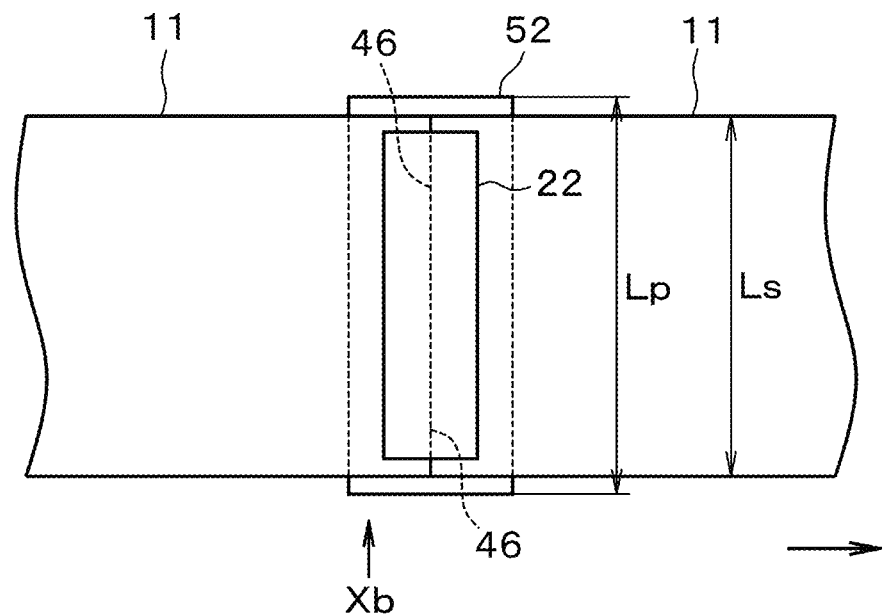
FIGS. 18A and 18B illustrate a second embodiment (illustrates the joining portion of the strip-shaped steel sheets).
Figure 18B:
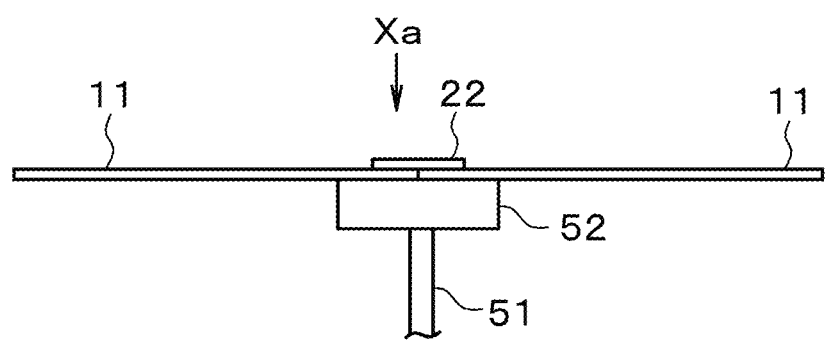

The cutting surface 43 of the upper blade 42 and the cutting surface 45 of the lower blade 44 each cuts the strip-shaped steel sheet 11 parallelly with respect to the shorter side direction. As shown in FIG. 18, an end surface 46 parallel with respect to the shorter side direction is formed in the remaining strip-shaped steel sheet 11 in step [1] and an end surface 46 parallel with respect to the shorter side direction is formed in the new strip-shaped steel sheet 11 in step [6]. Further, in step [9], the end surfaces 46 of the two strip-shaped steel sheets 11 are arranged to be face to face with one another.

As shown in FIG. 18, the backup plate 52 is parallel with respect to the shorter side direction of the strip-shaped steel sheet 11. In step [11], the backup plate 52 supports the interfacing portion of the two strip-shaped steel sheets 11 from below and in step [12], the adhesive tape 22 is attached along the end surfaces 46 of the two strip-shaped steel sheets 11. Length Lp of the backup plate 52 is set to be greater than width Ls of the strip-shaped steel sheet 11. One end surface of the backup plate 52 projects outward from one end surface in the shorter side direction of the strip-shaped steel sheet 11 and the other end surface of the backup plate 52 projects outward from the other end surface in the shorter side direction of the strip-shaped steel sheet 11.

The presser plate 58 presses the adhesive tape 22 from above in step [13] and the two cutters 61 are secured to the presser plate 58. Each of the two cutters 61 are provided with the blade 62. In step [14], the adhesive tape 22 is cut when the two ends of the adhesive tape 22 are pressed against the blades 62 from below. As a result, one end surface in the longer side direction of the adhesive tape 22 is located inward compared to one end surface in the shorter side direction of the strip-shaped steel sheet 11 and the other end surface in the longer side direction of the adhesive tape 22 is located inward compared to the other end surface in the shorter side direction of the strip-shaped steel sheet 11.

(Third Embodiment)

In step [9], the clamp 35 temporarily returns to the lifted position from the lowered position to release the clamping of the new strip-shaped steel sheet 11 before the lifter 49 moves from the lowered position to the lifted position. In step [9], the lifter 49 moves from the lowered position to the lifted position with the clamping of the new strip-shaped steel sheet 11 released and supports the sagging portion of the remaining strip-shaped steel sheet 11 from below. The clamp 35 moves from the lifted position to the lowered position again with the remaining strip-shaped steel sheet 11 supported to clamp the new strip-shaped steel sheet 11 again.

The third embodiment provides the following effects.

The lifter 49 is moved from the lowered position to the lifted position with the clamping of the new strip-shaped steel sheet 11 released. Thus, when the reverse feed direction end of the remaining strip-shaped steel sheet 11 contacts the feed direction end of the new strip-shaped steel sheet 11, the new strip-shaped steel sheet 11 is shifted in the reverse feed direction. As a result, the end surfaces 46 of the two strip-shaped steel sheets 11 become horizontally face to face with one another without the new strip-shaped steel sheet 11 bulging upward by being pressed by the remaining strip-shaped steel sheet 11.

In the first to third embodiments, the operator may press the adhesive tape 22 with the presser plate 58 and cut the adhesive tape 22 with scissors or the like at locations where the adhesive tape 22 sticks out from the presser plate 58.

In the first to third embodiments, the 2 cutters 61 may be secured to the presser plate 58 so that the blades 62 are oriented laterally.

In the first to third embodiments, the adhesive tape 22 may be attached automatically to the remaining strip-shaped steel sheet 11 and the new strip-shaped steel sheet 11 by a robot, or the like.

In the first to third embodiments, the stator blanks 3 may be punched out from the strip-shaped steel sheet 11 in one row or three or more rows taken along the shorter side direction.

In the first to third embodiments, a product other than the stator blank 3 may be punched out from the strip-shaped steel sheet 11.

In the first to third embodiments, blanks that become a product by themselves without having to be laminated may be punched out from the strip-shaped steel sheet 11.

In the first to third embodiments, the remaining strip-shaped steel sheet 11 and the new strip-shaped steel sheet 11 may be joined by the adhesive tape 22 without cutting the reverse feed direction end of the remaining strip-shaped steel sheet 11 and the feed direction end of the new strip-shaped steel sheet 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A method of joining strip-shaped sheets comprising:
   cutting at each of a reverse feed direction end of a strip-shaped sheet fed to a pressing machine and a feed direction end of a new strip-shaped sheet;
   placing the reverse feed direction end of the strip-shaped sheet fed to the pressing machine and the feed direction end of the new strip-shaped sheet face to face with one another;
   placing a first plate in contact with the reverse feed direction end of the strip-shaped sheet fed to the pressing machine and the feed direction end of the new strip-shaped sheet, wherein the reverse feed direction end of the strip-shaped sheet fed to the pressing machine and the feed direction end of the new strip-shaped sheet are arranged to be face to face with one another; and
   joining the new strip-shaped sheet to the strip-shaped sheet fed to the pressing machine by attaching a tape on the reverse feed direction end of the strip-shaped sheet fed to the pressing machine and the feed direction end of the new strip-shaped sheet, wherein the tape is attached from a side opposite the first plate with the first plate placed in contact with the reverse feed direction end of the strip-shaped sheet fed to the pressing machine and the feed direction end of the new strip-shaped sheet and with the reverse feed direction end of the new strip-shaped sheet and the feed direction end of an additional new strip-shaped sheet arranged to be face to face with one another,
   wherein the cutting is performed with the first plate in a first position, and the placing is performed with the first plate moved to a different position from the first position.

2. The method of joining strip-shaped sheets according to claim 1, wherein the tape is colored differently from the strip-shaped sheet fed to the pressing machine and the new strip-shaped sheet.

3. The method of joining strip-shaped sheets according to claim 1, wherein the tape is pressed by a second plate from a side opposite the first plate and the tape is cut at locations where the tape sticks out from the second plate.

4. The method of joining strip-shaped sheets according to claim 1, wherein the tape is pressed by a second plate having two blades from a side opposite the first plate and two ends of the tape are cut by being pressed against the blades of the second plate.

5. The method of joining strip-shaped sheets according to claim 4, wherein each of the two blades of the second plate comprises a serrated blade.

6. The method of joining strip-shaped sheets according to claim 1, wherein the first plate has a greater width than a width of the tape.

\* \* \* \* \*